C. MICHAELS.
RADIATOR GUARD.
APPLICATION FILED FEB. 25, 1921.

1,411,121. Patented Mar. 28, 1922.

WITNESSES
Oliver W. Holmes
Robert D. Hulsizer

INVENTOR
CHARLES MICHAELS
BY
ATTORNEYS

UNITED STATES PATENT OFFICE.

CHARLES MICHAELS, OF NEW YORK, N. Y.

RADIATOR GUARD.

1,411,121. Specification of Letters Patent. Patented Mar. 28, 1922.

Application filed February 25, 1921. Serial No. 447,818.

*To all whom it may concern:*

Be it known that I, CHARLES MICHAELS, a citizen of the United States, and a resident of the city of New York, East Elmhurst, borough of Queens, in the county of Queens and State of New York, have invented a new and Improved Radiator Guard, of which the following is a full, clear, and exact description.

This invention relates to radiator guards, and has for an object the provision of a simple, compact and rugged guard for radiators.

Another object resides in the provision of a radiator guard which is so made that the constant jar or vibration to which it is subjected will not cause its part to work loose and rattle.

A further object resides in the provision of a reinforcing element for radiator guards so applied that distortion or bending of the guard members is not easily effected by contact.

A still further object resides in the particular construction and arrangement of parts which are hereinafter described and claimed and shown in the accompanying drawings.

The invention is illustrated in the drawings, of which—

Figure 1:
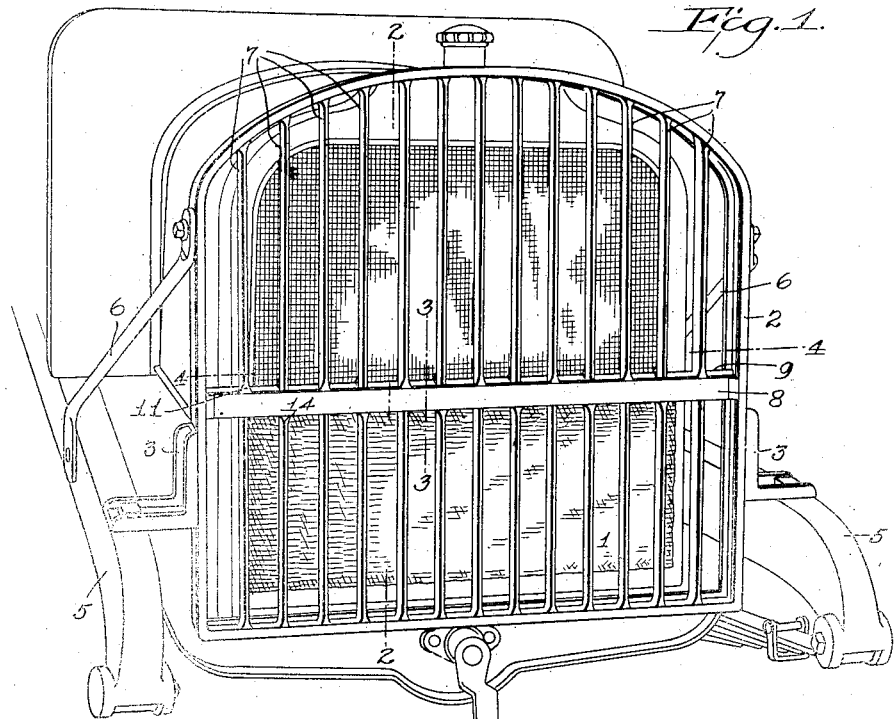
Figure 1 is a perspective view of the front of an automobile showing the guard placed.

The preferred embodiment of my invention, as shown in the drawings, may be attached to the front of an automobile radiator 1. The invention comprises a channel bar 2 made in the form of a frame. This guard frame 2 may be fastened as shown by brackets 3 to the chassis bars of the automobile. The upper portion of the frame may be additionally reenforced by a bracket bar 6 connecting it with another point on the chassis. The channel portion of the frame member 2 faces inwardly.

The frame member is provided with a plurality of conveniently spaced, vertically extending flat bars 7 the upper and lower ends of which are disposed within the channel of the frame member 2 and are welded thereto both at the front and rear contacting faces thereof.

Figure 2:
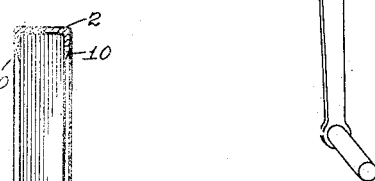
Figure 2 is a vertical transverse section taken on the line 2—2 of Figure 1.
Figure 4:
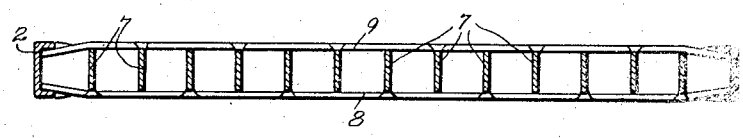
Figure 4 is a transverse horizontal section taken on the line 4—4 of Figure 1.
Figure 3:
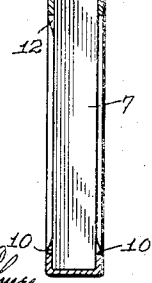
Figure 3 is a similar section taken on the line 3—3 of Figure 1.
Figure 3:
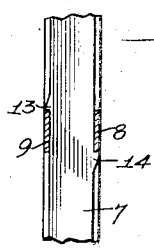

Horizontally extending across the front and back of the bars 7 are reenforcing plates or members 8 and 9. In Figure 2 the numeral 10 indicates the points at which the vertically extending bars 7 are welded at the front and rear and the adjacent portions of the channel frame member 2. The ends of the horizontally extending plates or bars 8 and 9 are also welded to the sides of the channel member 2. The bars 7 are welded to the reenforcing bars 8 and 9 as follows: In Figure 2, considering the reenforcing member 8, successive bars 7 are welded thereto alternately at the upper and lower edges of the bar 8. As shown in Figs. 1, 2 and 3, the bars 7 are welded to the plate 8 at a point designated by the numerals 11 and 14 successively and alternately as shown.

Considering the reenforcing bar or member 9, the upper edge of this bar is welded to the rear edge of those bars 7 which were welded to the lower edge of the bar 8. On the other hand, the lower edge of the bar 9 is welded to those bars 7 which were welded to the upper edge of the bar 8. This particular manner of welding results in a structure which is rigid and compact and yet at the same time is flexible and is not liable to work loose under stress.

What I claim is:

1. A radiator guard comprising a channel member formed into a frame of a shape simulating the outline of the radiator to be protected, the channel portion of said member facing inwardly, a plurality of spaced guard bars extending across said frame between opposite sides thereof, the end of said bars projecting into said channel portion and being welded thereto, and a reenforcing bar or plate extending across the guard bars and projecting into said channel portion and being welded at its ends thereof, said reenforcing bar or plate being welded to successive guard bars alternately at its upper and lower edges.

2. A radiator guard comprising a channel member formed into a frame of a shape simulating the outline of the radiator to be protected, the channel portion of said member facing inwardly, a plurality of spaced guard bars extending across said frame between opposite sides thereof, the ends of said bars projecting into said channel portion and being welded thereto, and a pair of reenforcing plates or bars extending across the front and rear of the guard bars and projecting into the channel portion and being welded at their ends thereof, each of said reenforcing bars being welded to successive guard bars alternately at its upper and lower edges, the welded points of the front reenforcing bar being staggered with respect to the welded points of the rear reenforcing bar.

CHARLES MICHAELS.